(12) United States Patent
Koppi et al.

(10) Patent No.: US 9,976,525 B2
(45) Date of Patent: May 22, 2018

(54) FUEL FILTER DEVICE

(71) Applicant: Mahle International GmbH, Stuttgart (DE)

(72) Inventors: Peter Koppi, Sankt Margarethen (AT); Maria Kraut, St. Michael (AT)

(73) Assignee: Mahle International GmbH (DE)

( * ) Notice: Subject to any disclaimer, the term of this patent is extended or adjusted under 35 U.S.C. 154(b) by 137 days.

(21) Appl. No.: 15/057,833

(22) Filed: Mar. 1, 2016

(65) Prior Publication Data
US 2016/0258398 A1   Sep. 8, 2016

(30) Foreign Application Priority Data

Mar. 2, 2015   (DE) .......................... 10 2015 203 687

(51) Int. Cl.
| F02M 37/22 | (2006.01) |
| B03C 11/00 | (2006.01) |
| B01D 29/01 | (2006.01) |
| B01D 36/00 | (2006.01) |

(52) U.S. Cl.
CPC ......... *F02M 37/221* (2013.01); *B01D 29/018* (2013.01); *B01D 36/003* (2013.01); *B03C 11/00* (2013.01); *B03C 2201/02* (2013.01); *B03C 2201/30* (2013.01)

(58) Field of Classification Search
CPC . B03C 11/00; B03C 2201/02; B03C 2201/30; C10G 33/02; F02M 37/22; F02M 37/221; B01D 29/018; B01D 17/00; B01D 36/003; Y10S 210/05

See application file for complete search history.

(56) References Cited

U.S. PATENT DOCUMENTS

| 4,372,847 | A | 2/1983 | Lewis |
| 4,661,227 | A | 4/1987 | Reeder, Jr. et al. |
| 5,244,550 | A | 9/1993 | Inoue |
| 5,575,896 | A | 11/1996 | Sams et al. |
| 5,643,469 | A | 7/1997 | Prevost et al. |
| 2008/0257739 | A1* | 10/2008 | Sams ................... B01D 17/045 204/554 |

(Continued)

FOREIGN PATENT DOCUMENTS

| DE | 102010062813 A1 | 6/2012 |
| DE | 102011120653 A1 | 6/2013 |

(Continued)

OTHER PUBLICATIONS

European Search Report dated Nov. 15, 2016 in relation to EP 16154628.8.

(Continued)

*Primary Examiner* — Walter D. Griffin
*Assistant Examiner* — Cameron J Allen
(74) *Attorney, Agent, or Firm* — Fishman Stewart PLLC

(57) ABSTRACT

A fuel filter device for an internal combustion engine may include a ring filter element separating a raw side from a clean side. A water separator configured as an electric coalescer may be arranged on the clean side for separating water from the fuel. The electric coalescer may include at least two electrodes arranged coaxially with respect to the filter axis, and at least one of the electrodes may be insulated from the fuel.

7 Claims, 5 Drawing Sheets

(56) References Cited

U.S. PATENT DOCUMENTS

| | | | |
|---|---|---|---|
| 2010/0155318 A1* | 6/2010 | Lika | ................ B01D 27/148 210/185 |
| 2011/0031124 A1 | 2/2011 | Hana | |
| 2013/0327699 A1 | 12/2013 | Gaenswein et al. | |
| 2014/0008286 A1 | 1/2014 | Jiang et al. | |
| 2014/0339089 A1 | 11/2014 | Tienhaaraa et al. | |
| 2015/0275716 A1 | 10/2015 | Jokschas et al. | |
| 2016/0010605 A1 | 1/2016 | Veit et al. | |

FOREIGN PATENT DOCUMENTS

| | | | |
|---|---|---|---|
| DE | 102012024349 A1 | 6/2014 | |
| GB | 494153 A | 10/1938 | |
| GB | 1046317 A | 10/1966 | |
| WO | WO-2013164002 A2 | 11/2013 | |
| WO | WO-2014119978 A1 | 8/2014 | |

OTHER PUBLICATIONS

European Search Report dated May 24, 2017 related to corresponding European Application No. 16154628.8.

* cited by examiner

FUEL FILTER DEVICE

CROSS-REFERENCE TO RELATED APPLICATIONS

This application claims priority to German Patent Application No. 10 2015 203 687.1, filed Mar. 2, 2015, the contents of which are hereby incorporated by reference in its entirety.

TECHNICAL FIELD

The present invention relates to a fuel filter device.

BACKGROUND

In modern fuel supply systems, water separators are usually employed in the associated fuel filter devices in order to lower as far as possible a water proportion contained in the fuel. If the water contained in the fuel is not separated, undesirable corrosion, abrasion, material embrittlement and cavitation can result in the following units. An increased water proportion in the fuel supply system likewise leads to a growth promotion of micro-organisms, which bring about sliming-up of the fuel filter device and can caused increased corrosion on the filter housing. As water separators, so-called coalescers are usually employed, which coalesce minutest water proportions into larger water droplets, separating these out of the fuel-water emulsion because of the gravity. Insofar as necessary for the water separation, a so-called end separator consisting of a hydrophobic fabric can filter out the water drops contained in the fuel-water emulsion. The water separated in this manner is then collected in separate water collection spaces, from which it is drained periodically or when replacing a filter element at the latest.

From DE 10 2010 062 813 A1 a filter device for an internal combustion engine of a motor vehicle, in particular a fuel or lubricant filter, with a filter housing and a ring filter element arranged in the same flowed through in radial direction from a raw side to a clean side. On the clean side of the filter element and below the same, a water separator is arranged here, which comprises a hydrophobic annular membrane extending in axial direction of the filter element that is permeable for fuel/lubricant from radially outside to radially inside. This is a classic coalescer which is to improve the degree of water separation. Disadvantageous with the water separators known from the prior art is that these only have a limited lifespan, the efficiency towards the end of the lifespan in part decreases substantially and should therefore be for example periodically replaced.

SUMMARY

The present invention deals with the problem of stating an improved embodiment for a fuel filter device which achieves in particular continuously good separation values and no longer requires replacing the water separator.

According to the invention, this problem is solved through the subjects of the independent claims. Advantageous embodiments are subject of the dependent claims.

The present invention is based on the general idea of employing a water separator designed as electric coalescer for separating a polar phase in a fuel filter device for an internal combustion engine, in particular for separating water out of the fuel, wherein this water separator designed as electric coalescer is arranged within the ring filter element on the clean side and additionally comprises two electrodes that are arranged with respect to the filter axis of which at least one is preferably mechanical and/or electrical insulated by the fuel. In comparison with conventional coalescers with corresponding coalescer materials, a water separator designed as electric coalescer is not subjected to any or only minor wear and can remain in the fuel filter device throughout the entire lifespan of the same because of this. In particular the maintenance effort for such a fuel filter device can thereby be clearly reduced. In addition, an electric coalescer is less sensitive to the composition of the fuel, further additives and water without negatively affecting the separation performance. Of particular advantage in addition is that a water separator designed as electric coalescer offers the possibility of individually influencing specific parameters of the separation process, for example the drop movement or drop formation. Of particular advantage in the arrangement of the two electrodes of the water separator according to the invention additionally is that these can be arranged in places that are not occupied up to now, as a result of which the fuel filter device according to the invention can be constructed in a highly compact manner.

By dispersing water in fuel, a water-fuel emulsion is generated. This is a binary system, the substantial feature of which is the formation of a miscibility gap which extends almost throughout the entire concentration range. Because of the thermodynamic instability of the system, the same strives for a state which considered energetically, constitutes a minimum. The separation of the two phases is thus accelerated until finally complete phase separation is present. In order to intensify the emulsifying process with a water-fuel emulsion, the advantageous effect of the presence of an electric field is now utilised. Here, the process of drop coalescence is enforced through the polarising effect of the applied electric field. The forces in the electric field that occur bring about an increase of the mobility of the water drops, which consequently leads to a higher rate of collision, which in turn has a positive effect on the drop coalescence. The drops thus unite to form larger drops and flow together. When the drops are suitable in size, gravity predominates and the specific denser water phase sinks.

According to a first possible embodiment of the fuel filter device according to the invention, the two electrodes are designed tubularly and form an annular channel, which comprises tangentially directed inflow openings arranged in the state of installation at the top, which force a helical flow of the fuel in the annular channel. In the present case, the water separator that is designed as electric coalescer is thus arranged on the clean side between the ring filter element and an end separator, so that the ring filter element itself need not necessarily have a coalescing effect. The electrode of the water separator located outside serves as guiding element for the fuel flowing through the ring filter element, deflecting it outwards to the inflow openings. There, the fuel tangentially enters the annular channel limited by the two electrodes through the inflow openings, as a result of which the helical flow of the fuel downwards in the annular channel is brought about. The helical flow and the swirl effect connected with this supports the dewatering of the fuel. The electrode located outside in this case can serve for example as earth electrode, whereas the electrode located inside is supplied with voltage. Alternatively, both electrodes can obviously also be supplied with voltage. In particular the first version makes possible however a comparatively cost-effective construction.

Practically, an end separator is provided at the lower end of the electrode located inside, which via a bell-like intermediate piece merges into the electrode located inside. On this bell-like intermediate piece, swirl-imparting ribs can be additionally arranged, which support a movement of the coalesced water drops radially to the outside. There, the colesced water droplets strike the wall of the fuel filter device on which they fall down into a water collection space arranged below the end separator. The fuel that is at least largely freed of the water proportions subsequently flows through the end separator and a clean channel provided within the electrode provided inside to the internal combustion engine. The emulsion separation itself takes place by means of electrocoalescence in the annular gap between the two electrodes, wherein one of these or both can be embodied preferably mechanical and/or electrical insulated and these usually have smooth metal surfaces under the insulating layer. Through the tangentially directed inflow openings, a helical flow path in the annular gap is enforced, which additionally supports the water separation.

With an embodiment that is alternative to this one, the electrode located outside is designed tubularly with an upper passage, whereas the electrode located inside is designed cylindrically and on its outer surface directed outwardly comprises a helical groove. Both electrodes in this case contact one another and delimit a helical channel which via the passage is connected to the clean side in a fluid-transmitting manner. The channel is thus delimited on one side by the electrode located outside, while on the three remaining sides, provided it is a rectangular channel, it is delimited by the electrode located inside. With this version, the electric coalescer is likewise located according to the invention downstream of the ring filter element and thus on the clean side, wherein the construction of the electrodes is configured so that the flow path is extended, in that the inner electrode for example is a solid or hollow cylinder block, in which on the outer shell surface the flow channels are milled in. Through the lengthening of the path because of the likewise helical channel, a clearly longer contact time between the fuel to be cleaned and the electrodes can be achieved, which likewise has a positive influence on the coalescing effect of the electric coalescer.

In a further advantageous embodiment of the solution according to the invention, the electrode located outside and the electrode located inside together delimit a zigzag-like annular channel. The zigzag-like annular channel in this case is visible in a longitudinal section through the two electrodes, i.e. through a section along the filter axis. Through the zigzag shape it is possible that any water drops rebound on the opposite side and form a water film, which can then drain downwards into the water collection spaced arranged there. In order to avoid voltage peaks, the corners of the channel should be rounded however. Through the zigzag-like embodiment of the channel, the contact time with the two electrodes can be again extended and thus the degree of water separation positively influenced.

Practically, the electrode located outside is arranged, in a further alternative embodiment, on the ring filter element, whereas the electrode located inside is designed cylindrical or tubular. In addition, the electrode located outside comprises a pleated star-like metal mesh, which is designed complementarily to a pleated star of the ring filter element and lies against an inside of the same, wherein it is also conceivable alternatively that the electrode located outside is formed by metal pigments, which are arranged on an inside of the pleated star of the ring filter element. The electrode located outside can thus be a fine mesh or be formed through conductive particles on the surface of the ring filter element, which offers the major advantage that the electrode located outside is regularly renewed together with the ring filter element. When thus for example a damage occurs on the electrode located outside, this can be easily rectified by a simple replacement of the ring filter element.

With a further alternative embodiment of the solution according to the invention, the electrode located outside is designed as fluid-permeable metal frame, while the electrode located inside is designed cylindrical or tubular. Here, too, an annular channel is formed between the electrode located outside and the electrode located inside, wherein in this case the electrode located outside can even assume a supporting function of the ring filter element, in particular provided it is designed as its support frame. Here, too, replacement by simply changing the ring filter element would be easily accomplished in the event of damage to the electrode located outside.

Independently of the fuel filter device it is also conceivable to employ an electric coalescer in the region of a fuel line, wherein the electrode located outside can for example form a line shell, while the electrode located inside and which is arranged coaxially to the electrode located outside, constitutes the voltage-supplied electrode. The electrode located outside in this case can for example be the earth electrode. An electric water separator integrated in a fuel line in this manner makes possible additional water separation, so that this can be advantageous employed even upstream of the fuel filter device.

Alternatively to this it is also conceivable to wind the two electrodes about a fuel line by means of suitable windings of insulated bands and arrange the same in such a manner that with a cut an earth electrode is always located opposite a high-voltage electrode. This produces for a voltage field a helical structure (helical shape) through the fuel line or the channel. Such a configuration of the electric coalescer makes possible a comparatively simple production such as facilitated contacting of the two electrodes and improved dewatering through the helical structure of the voltage field.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

DETAILED DESCRIPTION

Figure 1:
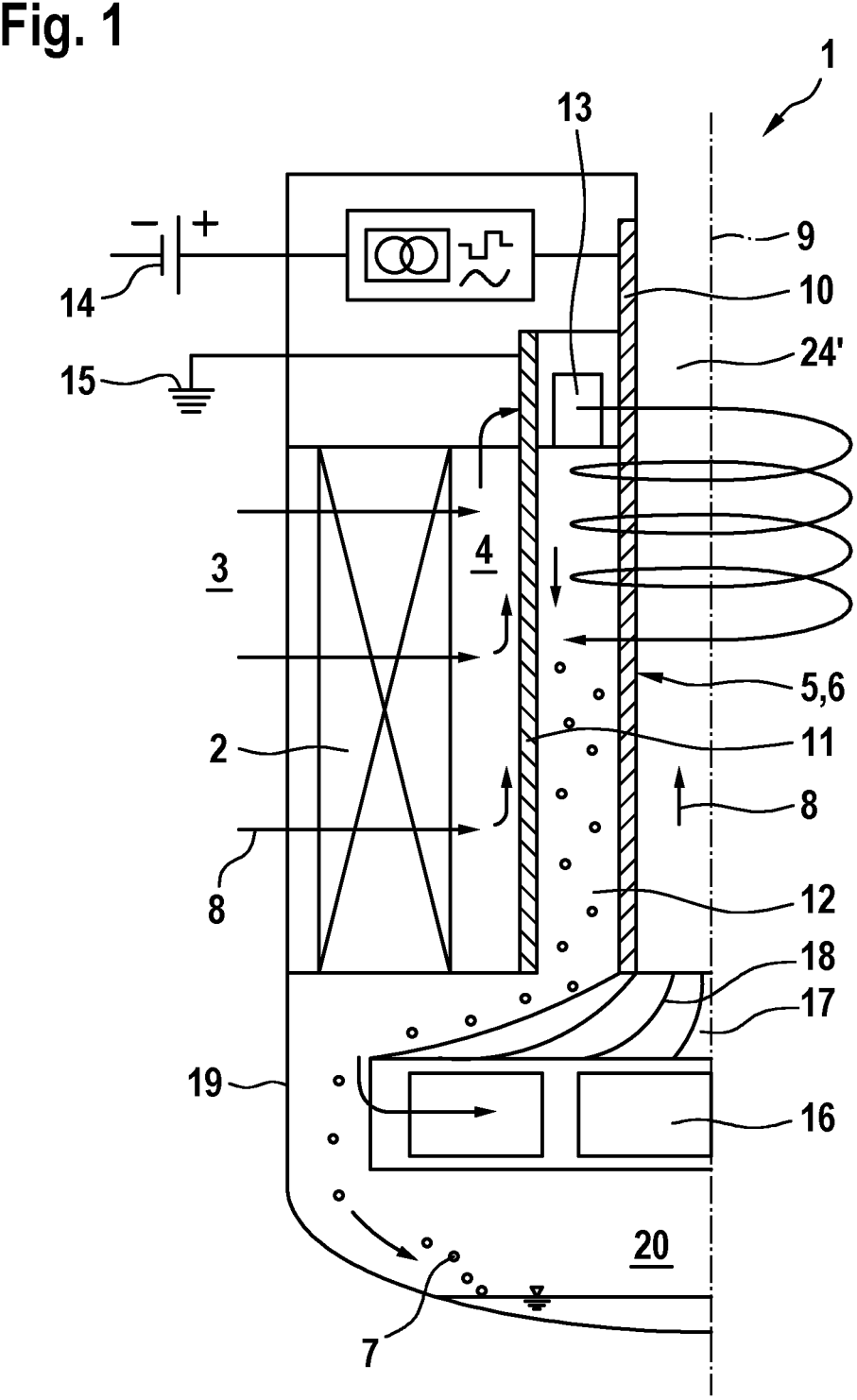
FIG. 1 a sectional representation through a fuel filter device according to the invention according to a first embodiment, FIG. 2 a detail representation from FIG. 1, however with other electrode located inside, FIG. 3 a representation as in FIG. 2, however with changed electrode located inside and located outside, FIG. 4 a further alternative embodiment of the fuel filter device according to the invention with the outer electrode arranged on the ring filter element, FIG. 5 a representation as in FIG. 4, however with an outer electrode designed as frame, FIG. 6 an alternative embodiment of the fuel filter device according to the invention with an outer electrode designed as deflection device, FIG. 7 a representation as in FIG. 6, however with a coalesce body located between the two electrodes, FIG. 8 a fuel line with an electrode located inside and located outside, FIG. 9 likewise a fuel line with wound electrodes.
Figure 2:
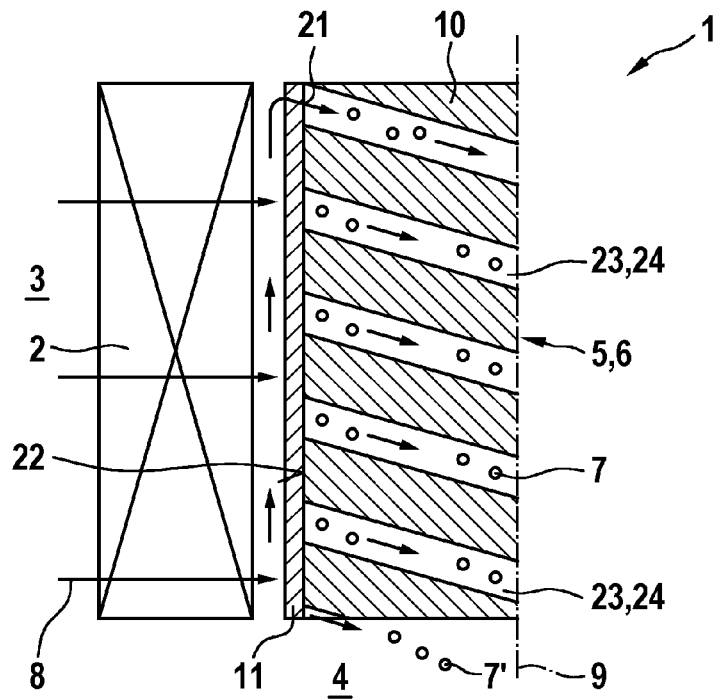

According to FIGS. 1 to 7, a fuel filter device 1 according to the invention for an internal combustion engine which is otherwise not shown, in particular in a motor vehicle, a ring filter element 2, which separates a raw side 3 from a clean side 4 and in the present case is thus flowed through from outside to inside. In addition to this, a water separator 6 designed as electric coalescer 5 for separating a polar phase, in particular for separating water 7 from the fuel 8 is provided. With all shown embodiments of the fuel filter device 1 according to the invention it is provided according to the invention that the water separator 6 designed as electric coalescer 5 is arranged on the clean side 4 within the ring filter element 2 and comprises two electrodes 10, 11 which are arranged coaxially with respect to the filter axis 9, of which at least one is preferably mechanical and/or electrical insulated from the fuel 8.

Looking at the fuel filter device 1 according to the invention in accordance with FIG. 1 it is evident that the two electrodes 10, 11 are tubular in design and delimit a annular channel 12, which in the installed state comprises tangentially directed inflow openings 13 that are arranged at the top, which enforce a helical flow of the fuel 8 in the annular channel 12. In the present case, the inner electrode 10 is connected to a voltage source 14, whereas the outer electrode 11 is connected to earth 15 and can therefore be generally also described as earth electrode.

The fuel flowing through the fuel filter device 1 and its ring filter element 2 from the raw side 3 to the clean side 4 is initially deflected upwards along the electrode 11 located outside until it reaches the inflow openings 13. Since these in tangential direction open into the annular channel 12, a swirl flow or a helical flow is imposed on the fuel 8 flowing into the annular channel 12 through the inflow openings 13, which on the one hand leads to an extended contact with the two electrodes 10, 11 and connected with this to an improved water separation. The heavier water droplets 7 here are flung outward against the electrode 11 located outside because of the centrifugal forces that materialise and drain downwards along the same. At the lower end of the electrode 10 located inside an end separator 16 is provided, which via a bell-like intermediate piece 17 merges into the electrode 10 located inside. On the intermediate piece 17 flow guiding elements 18, for example ribs are again arranged, which on the one hand further increase the coalescence and on the other hand are to fling the already coalesced water droplets 7 radially to the outside in the direction of a housing wall 19. From there, they can then sink downwards into a water collection space 20 located below the end separator 16. The fuel 8, by contrast, passes through the end separator 16 and flows upwards through a clean channel 24' formed by the hollow electrode 10 located inside and out of the fuel filter device 1.

With respect to the fuel devices 1 according to FIGS. 2 to 7, the same generally applies, except that the individual electrodes 10, 11 differ. Looking for example at the fuel filter device 1 according to FIG. 2 it is evident by way of this that the electrode 11 located outside is tubular in design with an upper passage 21. The electrode 10 located inside by contrast is designed cylindrically and comprises a helical groove 23 on its outer surface 20 directed to the outside. The electrode 11, 10 located inside and located outside in this case lie against one another and delimit a helical channel 24, which via the passage 21 is connected to the clean side 4 in a fluid-transmitting manner. Through the helical channel 24, a contact time between the fuel 8 to be cleaned and the two electrodes 10, 11 can likewise be again extended and thus the water-separating effect increased. If the groove 23 and thus also the channel 24 has a rectangular channel cross section, three channel walls of the channel 24 are formed by the electrode 10 located inside and a wall located outside by the electrode 11 located outside.

The groove 23 and thus also the channel 24 can be milled into the outer surface 22 of the electrode 10 located inside, whereas it is obviously also conceivable that the electrode 10 located inside does not have a solid cross section as shown, but likewise a tubular and thus a clean channel 24' located inside (see also FIGS. 1, 3 to 7), through which the fuel 8 cleaned of water proportions can be discharge from the fuel filter device 1.

Figure 3:
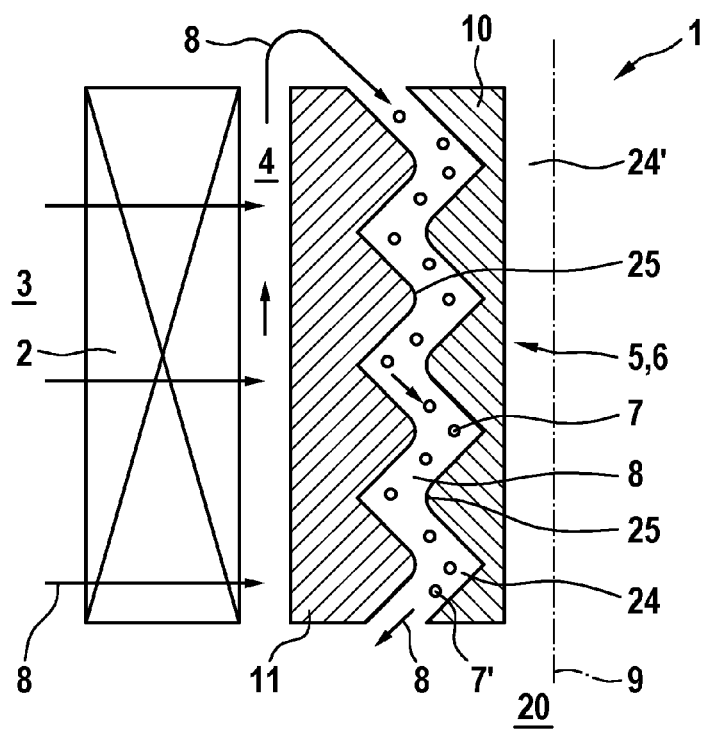

Looking at the fuel filter device 1 according to FIG. 3, it is evident that the channel 24, which is formed by the two electrodes 10, 11, with a cut through the longitudinal axis has a zigzag-shaped course and because of this again prolongs the dwell duration of the water 8 to be cleaned of water proportions between the two electrodes 10, 11. In order to avoid voltage peaks, the corners 25 should be additionally rounded off. In addition to the increased dwell duration of the fuel to be cleaned between the two electrodes 10, 11, the zigzag-shaped configuration of the channel 24 can also make available baffle surfaces, which favour the water separation.

Figure 4:
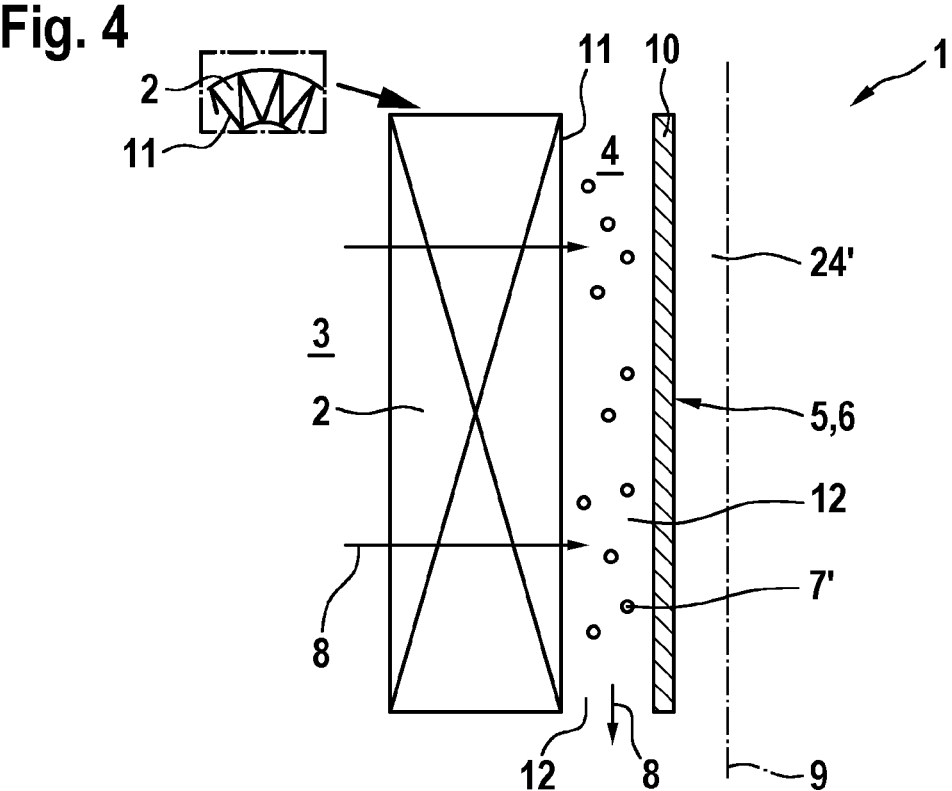

Looking at the fuel filter device 1 according to FIG. 4, it is evident by this that the electrode 11 located outside is arranged on the ring filter element 2, wherein this ring filter element 2 is designed in the manner of a pleated star. The electrode 10 located inside is again designed cylindrical or in the present case tubular. In this case, the electrode 11 located outside is thus a part of the ring filter element 2 and can be replaced with the same for example regularly. The electrode 11 located outside in this case can be designed as a pleated star-like metal mesh, which is designed complementarily to the pleated star of the ring filter element 2 and lies against the inside of the ring filter element 2. Alternatively it can also be provided that the electrode 11 located outside is formed through metal pigments, which are arranged on an inside of the pleated star of the ring filter element 2.

Figure 5:
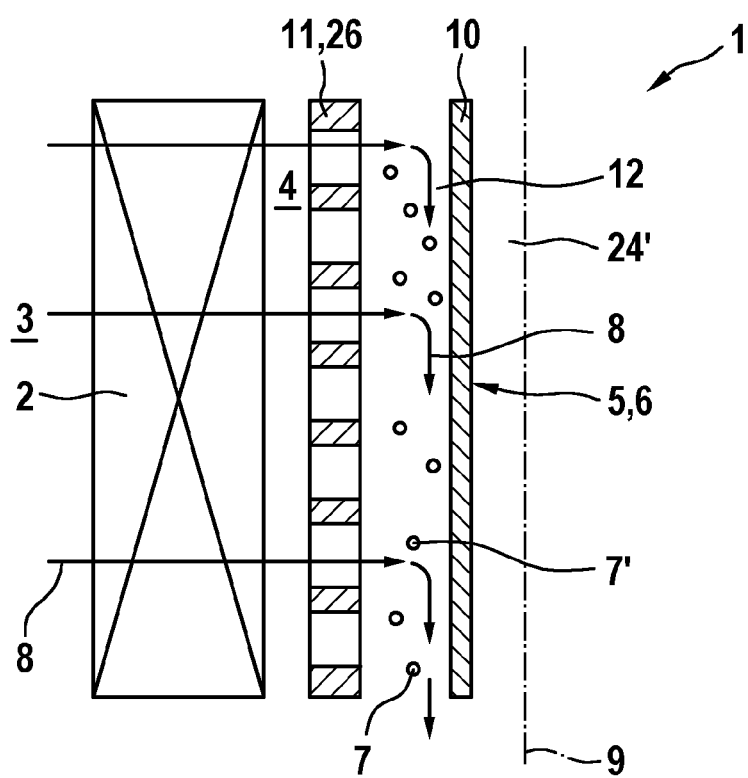

In the fuel filter device 1 according to the invention in accordance with FIG. 5, the electrode 11 located outside is designed as fluid-permeable metal frame 26, while the electrode 10 located inside is designed cylindrical or tubular. The electrode 11 located outside can be arranged spaced from the ring filter element 2 as is shown according to FIG. 5, or form a support frame of the ring filter element 2 and thus be in direct contact with the same. The electrode 10 located inside in turn forms a baffle wall and a deflection, on which the impacting water droplets 7' are coalesced and are diverted downwards into the water collection space 20. Here, too, a replacement of the electrode 11 located outside is comparatively easily possible through a simple replacement of the ring filter element 2.

Figure 6:
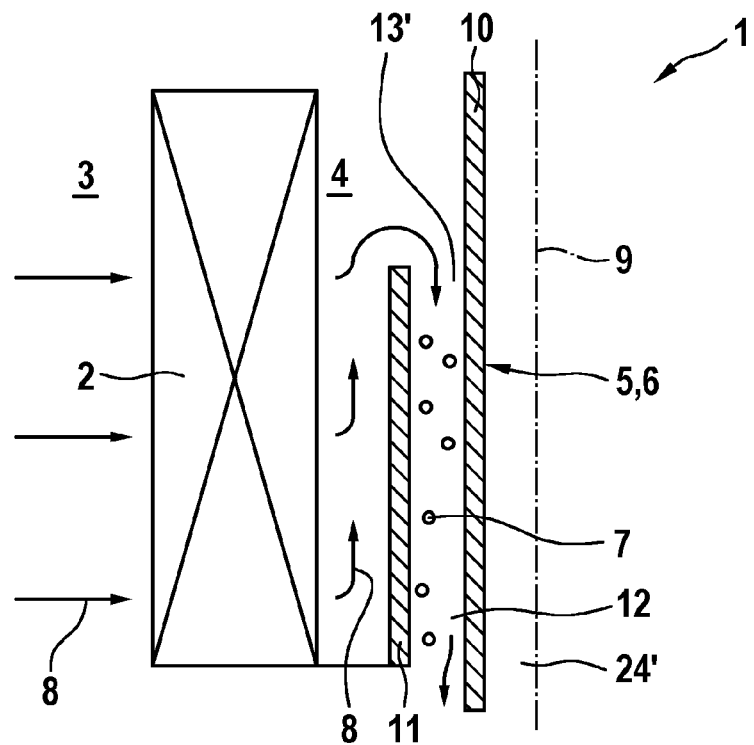
Figure 7:
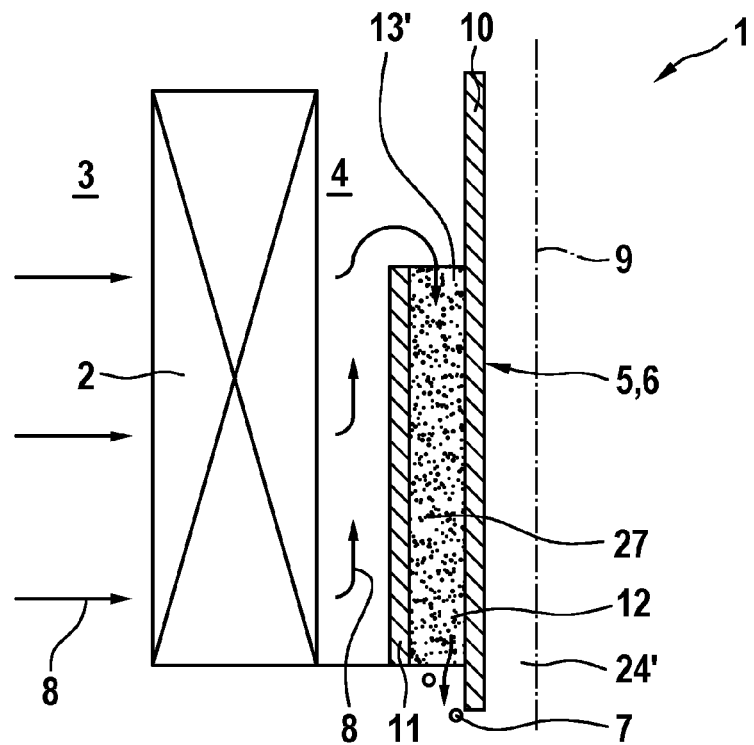

Looking at the fuel filter devices 1 shown in accordance with FIGS. 6 and 7, the electrode 11 located outside functions as deflection in order to deflect the fuel 8 to be cleaned of water proportions towards the top forcing it into the annular channel 12 located between the two electrodes 10, 11 via an inflow opening 13. In order to be able to additionally increase the coalescing effect in the annular channel 12, a porous coalesce body 27 can be arranged in the annular gap or in the annular channel 12, as is shown according to FIG. 7. Drainage of the fuel 8 cleaned of water proportions in turn can be affected by way of the clean channel 24' located within the electrode 10 located inside.

Figure 8:
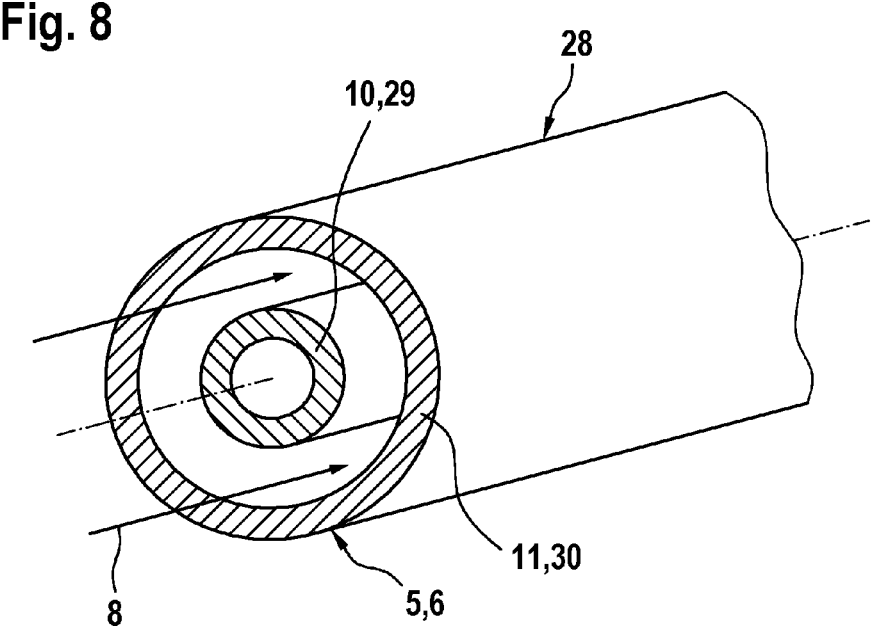
Figure 9:
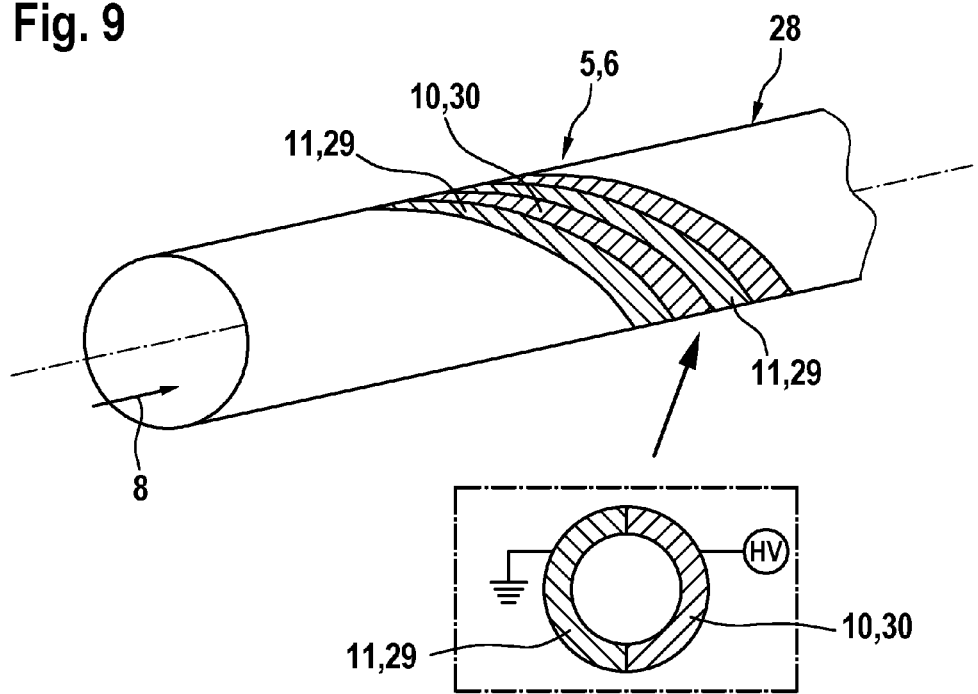

Additionally looking at FIGS. 8 and 9, a fuel line 28 with likewise two electrodes 10, 11 is evident in these. According to FIG. 8, the electrode 11 located outside in this case is arranged coaxially with respect to the electrode 10 located inside, whereas with the fuel line 28 shown according to FIG. 9, the two preferentially insulated electrodes 10, 11 are wound about the fuel line 28 in such a manner that an earth electrode 29 which is designed complementarily to the electrode 11 located outside and a high-voltage electrode 30 designed complementarily to the electrode 10 located inside in cross section in each case covers half of the circumference of the fuel line 28 (see the cross section from FIG. 9). Such a fuel line 28 with the associated electrodes 10, 11, 29, 30 can obviously be arranged also in the region of the fuel filter device 1 described in FIGS. 1 to 7 or upstream or downstream of the same at any location and serve for the additional or prepared water separation.

The invention claimed is:

1. A fuel filter device for an internal combustion engine, comprising:
   a ring filter element having a filter axis separating a raw side from a clean side,
   a water separator configured as an electric coalescer for separating water from a fuel flow,
   wherein the water separator configured as the electric coalescer is arranged on the clean side within the ring filter element and includes at least two electrodes arranged coaxially with respect to the filter axis, and wherein at least one electrode of the at least two electrodes is insulated from the fuel flow, and
   wherein the at least two electrodes are tubular-shaped and form an annular channel, which in an installed state defines tangentially directed inflow openings arranged at a top part and facilitate a helical flow of the fuel flow in the annular channel.

2. The fuel filter device according to claim 1, further comprising an end separator arranged at a lower end of at least one electrode disposed radially inside another electrode of the at least two electrodes, wherein the end separator via a bell-like intermediate piece merges into the at least one electrode.

3. The fuel filter device according to claim 1, wherein at least one electrode is disposed radially inside of another electrode of the at least two electrodes and delimits a clean channel.

4. A fuel filter device for an internal combustion engine, comprising:
   a ring filter element having a filter axis separating a raw side from a clean side;
   a water separator configured as an electric coalescer for separating water from a fuel flow;
   wherein the water separator configured as the electric coalescer is arranged on the clean side within the ring filter element and includes at least two electrodes arranged coaxially with respect to the filter axis, and wherein at least one electrode of the at least two electrodes is insulated from the fuel flow; and
   wherein one of:
   at least one electrode is disposed radially outside of another electrode of the at least two electrodes is tubular-shaped and has an upper passage, the at least one electrode disposed radially inside is cylindrical-shaped and includes a helical groove on an outer surface facing towards the radial outside, and the at least two electrodes engage against one another and delimit a helical channel connected to the clean side in a fluid-transmitting manner via the upper passage;
   at least one electrode is disposed radially outside and at least one radially inner electrode together delimit a zigzag-like annular channel;
   at least one electrode is disposed radially outside and is configured as a fluid-permeable metal frame and at least one radially inner electrode is at least one of cylindrical-shaped and tubular-shaped; or
   the at least two electrodes delimit an annular channel and a porous coalesce body is arranged in the annular channel.

5. The fuel filter device according to claim 4, wherein at least one electrode is disposed radially inside of another electrode of the at least two electrodes and delimits a clean channel.

6. A fuel filter device for an internal combustion engine, comprising:
   a ring filter element having a filter axis separating a raw side from a clean side;
   a water separator configured as an electric coalescer for separating water from a fuel flow;
   wherein the water separator configured as the electric coalescer is arranged on the clean side within the ring filter element and includes at least two electrodes arranged coaxially with respect to the filter axis, and wherein at least one electrode of the at least two electrodes is insulated from the fuel flow; and
   wherein at least one of:
   at least one electrode is disposed radially outside and includes a pleated star-like metal mesh body configured complementarily to a pleated star of the ring filter element and engages against an inside of the ring filter element; or
   at least one electrode is disposed radially outside and defines a plurality of metal pigments arranged on an inside of a pleated star of the ring filter element.

7. The fuel filter device according to claim 6, wherein at least one electrode is disposed radially inside of another electrode of the at least two electrodes and delimits a clean channel.

* * * * *